(12) United States Patent
Stinesen

(10) Patent No.: US 6,771,573 B1
(45) Date of Patent: Aug. 3, 2004

(54) OPTICAL SCANNING DEVICE COMPRISING A LENS SYSTEM WITH ADJUSTABLE INCLINATION

(75) Inventor: Bernardus Johannes Stinesen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 584 days.

(21) Appl. No.: 09/597,199

(22) Filed: Jun. 20, 2000

(30) Foreign Application Priority Data

Jun. 24, 1999 (EP) .............................................. 99202035

(51) Int. Cl.[7] .............................................. G11B 7/00
(52) U.S. Cl. .................. 369/44.15; 369/44.22
(58) Field of Search .......................... 369/44.14, 44.15, 369/44.16, 44.17, 44.18, 44.21, 44.22, 53.19, 53.3, 53.38, 53.39, 53.4, 53.18

(56) References Cited

U.S. PATENT DOCUMENTS

| | | | |
|---|---|---|---|
| 5,703,864 A | 12/1997 | Miyagi et al. | ............... 369/112 |
| 6,256,287 B1 * | 7/2001 | Baartman et al. | ........... 369/244 |
| 6,295,255 B1 * | 9/2001 | Seo et al. | ................. 369/44.32 |
| 6,501,710 B2 * | 12/2002 | Yokoyama et al. | ...... 369/44.14 |
| 6,532,199 B1 * | 3/2003 | Getreuer et al. | ......... 369/44.14 |

FOREIGN PATENT DOCUMENTS

| EP | 0538824 A2 * | 4/1993 | |
|---|---|---|---|
| EP | 09063062 | 3/1997 | ............ G11B/7/08 |

* cited by examiner

*Primary Examiner*—Thang V. Tran
*Assistant Examiner*—Bach Vuong
(74) *Attorney, Agent, or Firm*—Laurie Gathman

(57) ABSTRACT

The invention relates to an optical scanning device (17) for scanning an information carrier (9), such as a CD or DVD. The scanning device comprises a radiation source (31), a lens system (43) with an optical axis (45) for focussing a radiation beam (47) supplied by the radiation source into a scanning spot (55) on the information carrier, and a focussing actuator (65) for displacing the lens system with respect to a base part (29) of the scanning device in a direction parallel to the optical axis. The lens system is elastically suspended with respect to a suspension member (63) of the scanning device, said suspension member being arranged next to the lens system, viewed in a direction transverse to the optical axis. The scanning device further comprises an adjusting device (89) with a first part (97) and a second part (99), which can be displaced with respect to said first part to set an inclination of the lens system with respect to the information carrier about two mutually perpendicular inclination axes (91, 95). According to the invention, the second part of the adjusting device is provided on the suspension member, while the first part of the adjusting device is provided on a supporting member (101) which is arranged next to the lens system, viewed in a direction transverse to the optical axis. In this manner, a structural height of the optical scanning device, viewed in a direction parallel to the optical axis, is substantially not influenced by the presence of the adjusting device, so that said structural height can be reduced substantially. The optical scanning device in accordance with the invention can be used in an optical disc player according to the invention.

20 Claims, 5 Drawing Sheets

OPTICAL SCANNING DEVICE COMPRISING A LENS SYSTEM WITH ADJUSTABLE INCLINATION

BACKGROUND OF THE INVENTION

The invention relates to an optical scanning device for scanning an optically scannable information carrier, which scanning device is provided with a radiation source, an optical lens system having an optical axis for focussing a radiation beam supplied, in operation, by the radiation source into a scanning spot on the information carrier, an actuator for displacing the lens system with respect to a base part of the scanning device in a direction parallel to the optical axis, and an adjusting member for setting an inclination of the lens system with respect to the information carrier, the lens system being elastically suspended from a suspension member which, viewed in a direction transverse to the optical axis, is arranged next to the lens system, while the adjusting member is provided with a first part and a second part, which can be displaced with respect to the first part.

The invention also relates to an optical player comprising a table which is rotatable about an axis of rotation, an optical scanning device comprising an optical lens system for scanning an optically scannable information carrier which can be placed on the table, and a displacement device by means of which, during operation, at least the lens system of the scanning device can be displaced substantially in a radial direction with respect to the axis of rotation.

SUMMARY OF THE INVENTION

An optical scanning device and an optical player of the types mentioned in the opening paragraphs are disclosed in U.S. Pat. No. 5,703,864. The known optical player including the known optical scanning device employed therein is particularly suited for scanning optically scannable information carriers with a relatively high information density, such as DVD. To scan such information carriers in the right way, the inclination of the lens system with respect to the information carrier, i.e. the deviation from the right angle which the optical axis includes with respect to the information carrier, should remain within predetermined relatively narrow limits. In the manufacture of the optical scanning device, such a deviation develops as a result of manufacturing tolerances, particularly as a result of manufacturing tolerances in the lens system's elastic suspension from the suspension member. For this reason, the inclination of the lens system is adjusted once only with respect to a reference information carrier, by means of the adjusting member, after the manufacture of the optical scanning device. In the known optical scanning device, the second part of the adjusting member is provided on the base part on which also the suspension member and a stator part of the actuator are provided. The first part of the adjusting member is provided on a main frame of the optical scanning device. To minimize the structural height of the known optical scanning device, viewed in a direction parallel to the optical axis, the actuator is arranged, viewed in a direction transverse to the optical axis, next to the lens system, while the adjusting member is arranged directly below the lens system, viewed in a direction parallel to the optical axis. To keep a radiation beam path clear, the second part of the adjusting member is provided on a stepped support of the base part, which support is situated directly below the lens system.

A drawback of the known optical scanning device and the known optical player resides in that the stepped support of the base part leads to a relatively complicated construction of the scanning device and, viewed in a direction parallel to the optical axis, limited freedom of movement of the lens system.

It is an object of the invention to provide an optical scanning device and an optical player of the types mentioned in the opening paragraphs, wherein, viewed in a direction parallel to the optical axis, a minimum structural height is provided, as in the prior art, but the above-mentioned drawback of the known optical scanning device and the known optical player is obviated as much as possible.

To achieve this object, an optical scanning device in accordance with the invention is characterized in that the second part of the adjusting member is provided on the suspension member, while the first part of the adjusting member is provided on a supporting member which is arranged next to the lens system, viewed in a direction transverse to the optical axis.

To achieve this object, an optical player in accordance with the invention is characterized in that the optical scanning device used therein is an optical scanning device in accordance with the invention.

As a result of the fact that in the optical scanning device in accordance with the invention, the second part of the adjusting member is provided on the suspension member, while the first part of the adjusting member is provided on said supporting member, the adjusting member is positioned, viewed in a direction transverse to the optical axis, next to the lens system, so that, viewed in a direction parallel to the optical axis, the structural height of the optical scanning device is substantially not influenced by the presence of the adjusting member. Since the adjusting member is situated next to the lens system, viewed in a direction transverse to the optical axis, the adjusting member is at a distance from a radiation beam path of the optical scanning device, so that further constructional adaptations to preclude that the adjusting member obstructs the radiation beam are not necessary. In addition, the adjusting member in said position does not influence the freedom of movement of the lens system in a direction parallel to the optical axis.

A particular embodiment of an optical scanning device in accordance with the invention is characterized in that the supporting member is arranged in a fixed position with respect to the base part and a stator part of the actuator. Since the supporting member is arranged in a fixed position with respect to the base part and the stator part of the actuator, the operation of setting the inclination of the lens system with respect to the information carrier by means of the adjusting member also influences the inclination of the lens system, and of a translator part of the actuator attached thereto, with respect to the stator part. As the stator part is arranged, in this particular embodiment, in a fixed position with respect to the base part, the stator part can be accurately positioned with respect to the base part and with respect to a position of the information carrier, during the manufacture of the optical scanning device. By virtue thereof, both the inclination of the lens system with respect to the information carrier and the inclination of the translator part of the actuator with respect to the stator part can be simultaneously set within desired limiting values at a later stage using the adjusting member.

A further embodiment of an optical scanning device in accordance with the invention is characterized in that the first part of the adjusting member is provided with a first supporting surface having a component which extends at right angles to the optical axis, which first supporting surface is provided in a fixed position on the supporting member, and with a second and a third supporting surface which each have a component which extends at right angles to the optical axis, and which are in positions, with respect to the supporting member, which can be adjusted, viewed in a direction parallel to the optical axis, while the second part of the adjusting member is provided with a first, a second and a third supporting element, which bear against, respectively, the first, the second and the third supporting surface under the influence of a pretensioning force originating from an elastic pretensioning element, the second and the third supporting surface being arranged on either side of the first supporting surface, and a distance between the optical axis and an imaginary line through the second and the third supporting surface differing substantially from a distance between the optical axis and the first supporting surface. By using said three supporting surfaces and said three supporting elements, it is achieved that the inclination of the lens system with respect to the information carrier can be readily and accurately adjusted. As said three supporting elements bear against said three supporting surfaces under the influence of a pretensioning force, a degree of freedom of the suspension element parallel to the optical axis, and degrees of freedom of the suspension element with the lens system suspended therefrom about two inclination axes extending at right angles to the optical axis are fixed in a statically determined way. By adjusting the positions of the second and the third supporting surface over equal distances and in the same direction, viewed in a direction parallel to the optical axis, the inclination of the lens system about a first inclination axis is set, which first inclination axis is at right angles to the optical axis and parallel to the imaginary line through the second and the third supporting surface. By adjusting the positions of the second and the third supporting surface over equal distances and in opposite directions, viewed in a direction parallel to the optical axis, the inclination of the lens system about a second inclination axis is set, which second inclination axis is at right angles to the first inclination axis and the optical axis.

Yet another embodiment of an optical scanning device in accordance with the invention is characterized in that the second and the third supporting surface are each provided on an adjusting screw which can be turned with respect to the supporting member. By using adjusting screws, the inclination of the lens system with respect to the information carrier can be set in a simple and accurate way. The inclination thus set can be readily and reliably locked by locking the adjusting screws with respect to the supporting member by means of, for example, an adhesive.

A particular embodiment of an optical scanning device in accordance with the invention is characterized in that the first part of the adjusting member is provided with a fourth and a fifth supporting surface, which are substantially situated in an imaginary plane parallel to the optical axis, and are provided in fixed positions on the supporting member, and with a sixth supporting surface, which extends perpendicularly to the fourth and the fifth supporting surface and parallel to the optical axis, and which is provided in a fixed position on the supporting member, while the second part of the adjusting member is provided with a fourth and a fifth supporting element, which bear against, respectively, the fourth and the fifth supporting surface under the influence of a pretensioning force originating from the pretensioning element, and with a sixth supporting element for cooperation with the sixth supporting surface. By using the fourth, the fifth and the sixth supporting surface and the fourth, the fifth and the sixth supporting element, also two degrees of freedom of the suspension element, which are mutually perpendicular and extend at right angles to the optical axis, and a degree of freedom of the suspension element, with the lens system suspending therefrom about, the optical axis are fixed in a statically determined way.

A further embodiment of an optical scanning device in accordance with the invention is characterized in that the first part and the second part of the adjusting member are provided with, respectively, a seventh supporting surface and, cooperating therewith, a seventh supporting element by means of which the sixth supporting surface and the sixth supporting element can be held in position with respect to one another. By using the seventh supporting surface and the seventh supporting element, the pretensioning element does not have to supply a component of the pretensioning force which is directed at right angles to the sixth supporting surface, resulting in a simplification of the construction and attachment of the pretensioning element.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENTS

Figure 1:
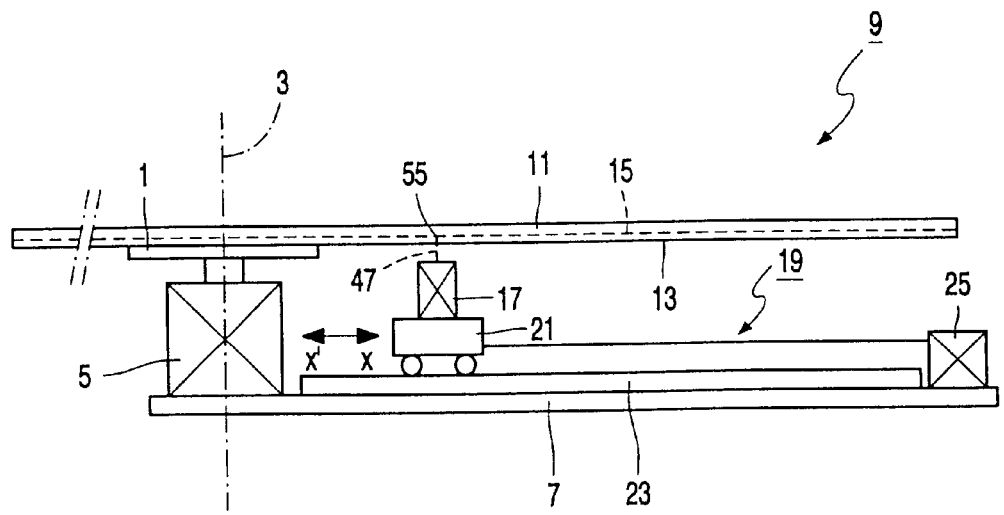
FIG. 1 diagrammatically shows an optical player in accordance with the invention.

The optical player in accordance with the invention, as diagrammatically shown in FIG. 1, comprises a table 1 which is rotatable about an axis of rotation 3 and drivable by an electric motor 5 which is mounted on a frame 7. On the table 1, an optically scannable information carrier 9, such as a DVD, can be arranged, which is provided with a disc-shaped carrier 11 and a transparent protective layer 13. A side of the carrier 11 bordering on the protective layer 13 forms an information layer 15 of the information carrier 9 on which a spiral-shaped information track is present. The optical player further includes an optical scanning device 17 in accordance with the invention for optically scanning the information track of the information carrier 9. The scanning device 17 can be moved mainly in two opposite radial directions X and X' with respect to the axis of rotation 3 by means of a displacement device 19 of the optical player. For this purpose, the scanning device 17 is secured to a slide 21 of the displacement device 19, which is further provided with a straight guiding means 23 over which the slide 21 is displaceably guided, which guiding means extends parallel to the X-direction and is provided on the frame 7, and with an electric motor 25 by means of which the slide 21 can be moved over the guiding means 23. In operation, an electric control unit of the optical player, which is not shown in the Figs., controls the motors 5 and 25, causing the information carrier 9 to be rotated about the axis of rotation 3 and, simultaneously, the scanning device 17 to be displaced parallel to the X-direction, in such a manner that the spiral-shaped information track present on the information carrier 9 is scanned by the scanning device 17. During scanning, information present on the information track can be read by the scanning device 17, or information can be written on the information track by the scanning device 17.

Figure 2:
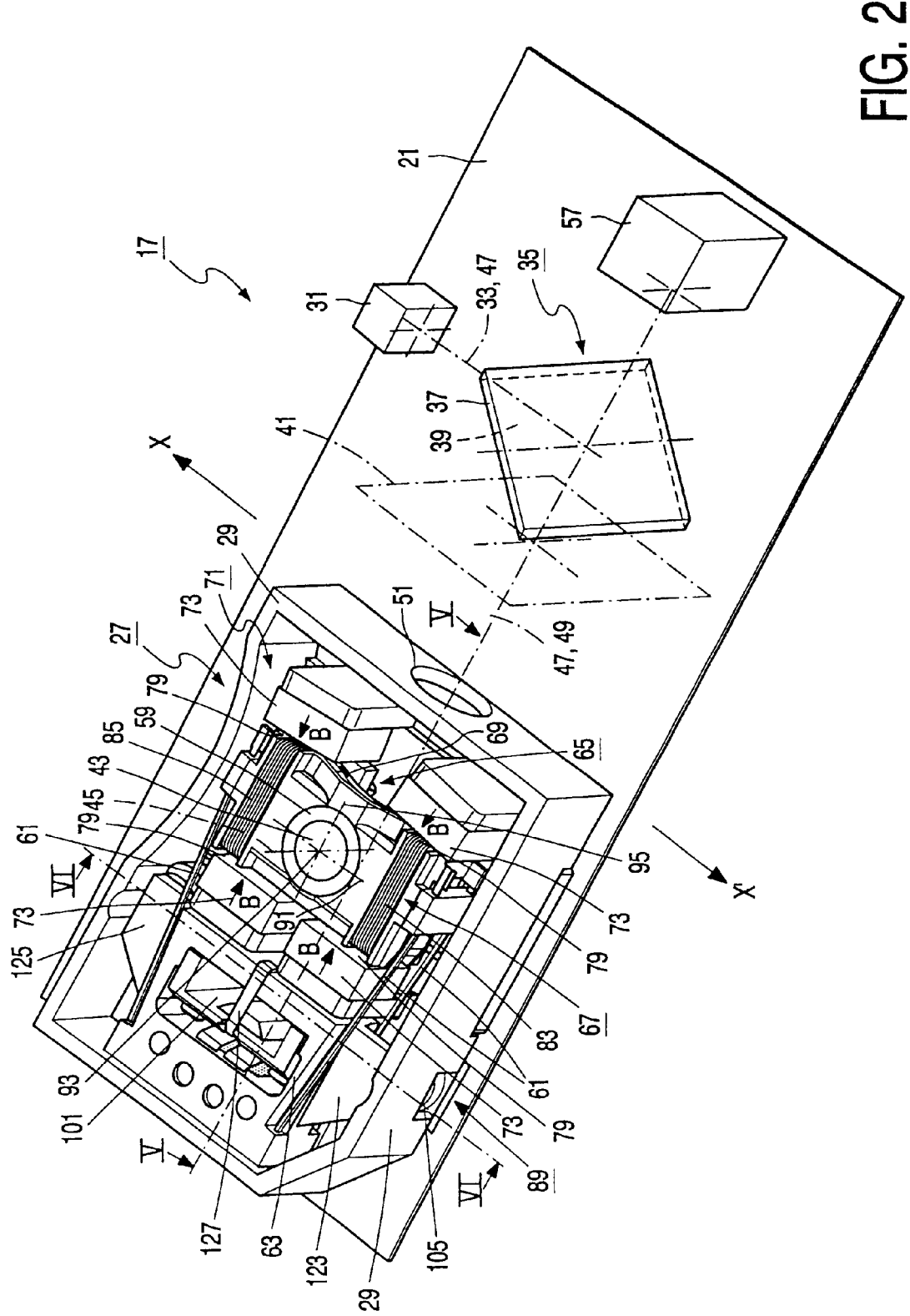
FIG. 2 shows an optical scanning device in accordance with the invention, which is used in the optical player shown in FIG. 1
Figure 5:
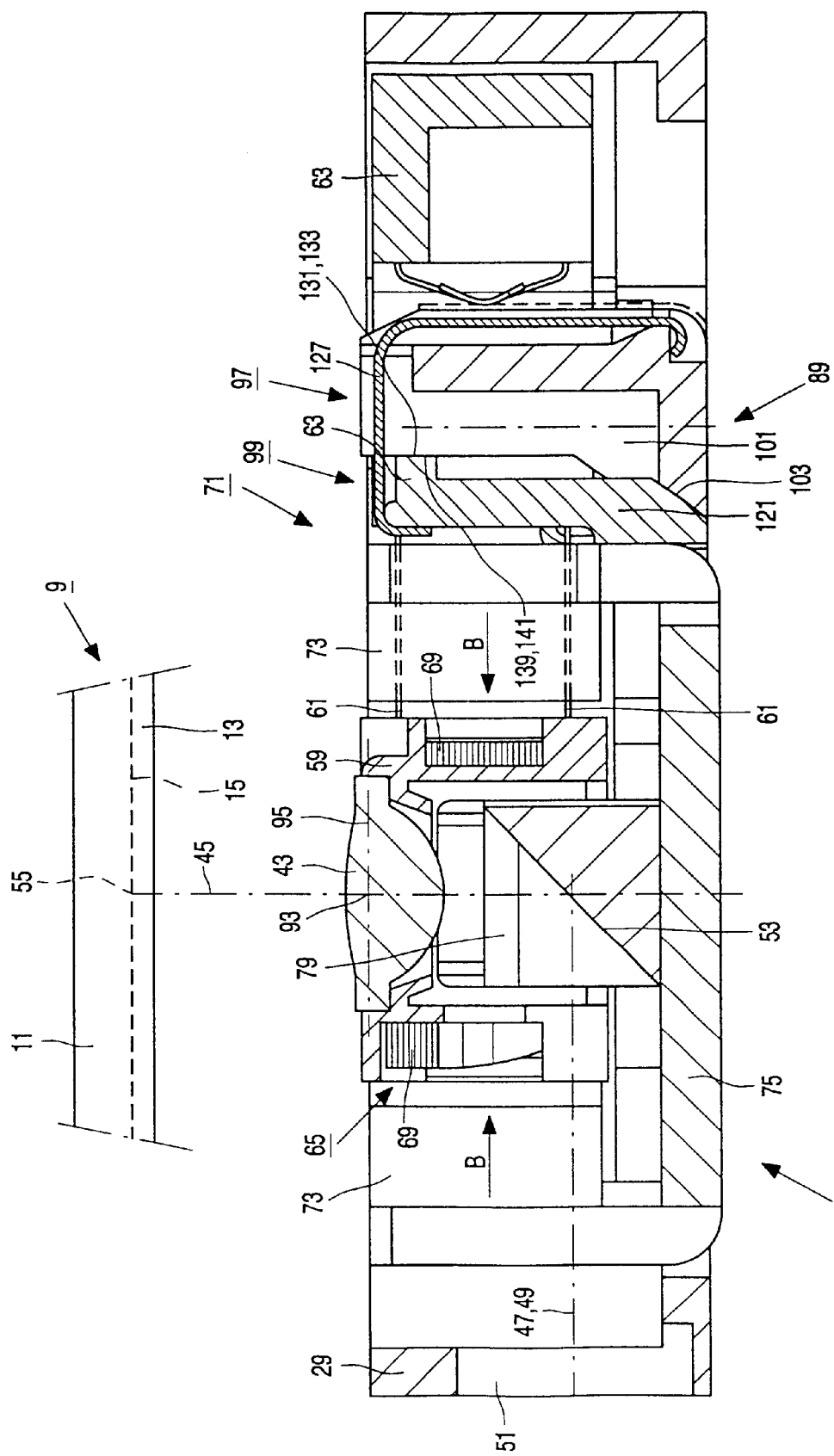
FIG. 5 is a sectional view taken on the line V—V in FIG. 2.

The optical scanning device 17 in accordance with the invention used in the optical player in accordance with the invention is shown, partly in detail and partly diagrammatically, in FIG. 2. The scanning device 17 is provided with an optical scanning unit 27, which comprises a base part 29, which is attached to the slide 21. FIG. 2 also shows the radial displacement directions X and X' of the slide 21. The scanning device 17 is further provided with a radiation source 31, such as a semiconductor laser, which radiation source has an optical axis 33 and is also connected to the slide 21. The scanning device 17 further comprises a radiation beam splitter 35, which includes a transparent plate 37 having a reflective surface 39 facing the radiation source 31, which transparent plate is arranged at an angle of 45° with respect to the optical axis 33 of the radiation source 31, and is also secured to the slide 21. The scanning device 17 further comprises a collimator lens 41, only diagrammatically shown in FIG. 2, which is also secured to the slide 21, and which is arranged between the transparent plate 37 and the scanning unit 27. The scanning unit 27 comprises an optical lens system 43 having an optical axis 45. In operation, the radiation source 31 generates a radiation beam 47, which is reflected by the reflective surface 39 of the radiation beam splitter 35 through an angle of 90°, so that the radiation beam 47 is guided via a radiation beam path 49, extending substantially perpendicularly to the optical axis 45 of the lens system 43 and substantially perpendicularly to the radial directions X and X', through the collimator lens 41 to the scanning unit 27. The radiation beam 47 enters the base part 29 of the scanning unit 27 via an opening 51 formed in the base part 29 and is reflected, as shown in FIG. 5, in the direction of the optical axis 45 of the lens system 43 by means of a mirror 53 secured in the base part 29. The radiation beam 47 is subsequently focussed into a scanning spot 55 on the information layer 15 of the information carrier 9 by the lens system 43. The radiation beam 47 is reflected by the information layer 15 and focussed onto an optical detector 57 via the lens system 43, the mirror 53, the radiation beam path 49, the collimator lens 41 and the radiation beam splitter 35, which optical detector is of a customary type that is known per se, and is secured to the slide 21 at a location which, with respect to the scanning unit 27, is situated behind the radiation beam splitter 35. To read information present on the information carrier 9, the radiation source 31 generates a continuous radiation beam 47, and the optical detector 57 supplies a detection signal that corresponds to a series of elementary information characteristics on the information track of the information carrier 9, which information characteristics are successively present in the scanning spot 55. To write information on the information carrier 9, the radiation source 31 generates a radiation beam 47 that corresponds to the information to be written, a series of successive elementary information characteristics on the information track of the information carrier 9 being generated in the scanning spot 55.

The lens system 43 is secured in a holder 59, which is suspended from a suspension member 63 by means of four metal rods 61, which extend transversely to the optical axis 45 of the lens system 43 and transversely to the radial directions X and X', said suspension member being arranged next to the lens system 43, viewed in a direction transverse to the optical axis 45. It is noted that FIG. 2 shows only three of the four rods 61. All four rods 61 are visible in FIG. 4, wherein the suspension member 63 with the lens system 43 suspended therefrom are separately shown. By using said four rods 61, the lens system 43 can be displaced relatively to the suspension member 63 and the base part 29 over comparatively small distances, parallel to the radial directions X and X' and parallel to the optical axis 45 of the lens system 43, said displacement involving elastic deformation of the rods 61. For this purpose, the scanning unit 27 comprises a first actuator 65, which will be described in greater detail hereinafter, by means of which the lens system 43 can be displaced with respect to the suspension member 63 and the base part 29 in a direction parallel to the optical axis 45 of the lens system 43, and a second actuator 67 by means of which the lens system 43 can be displaced with respect to the suspension member 63 and the base part 29 in a direction parallel to the radial directions X and X'. By displacing the lens system 43 by means of the first actuator 65 in a direction parallel to the optical axis 45 of the lens system 43, the scanning spot 55 is focussed on the information layer 15 of the information carrier 9 with the desired accuracy. By displacing the lens system 43 by means of the second actuator 67 in a direction parallel to the radial directions X and X', the scanning spot 55 is maintained on the information track to be followed, with the desired accuracy. For this purpose, the first actuator 65 and the second actuator 67 are controlled by the above-mentioned control unit of the optical player, which receives a focus-error signal as well as a tracking-error signal from the optical detector 57.

Figure 3:
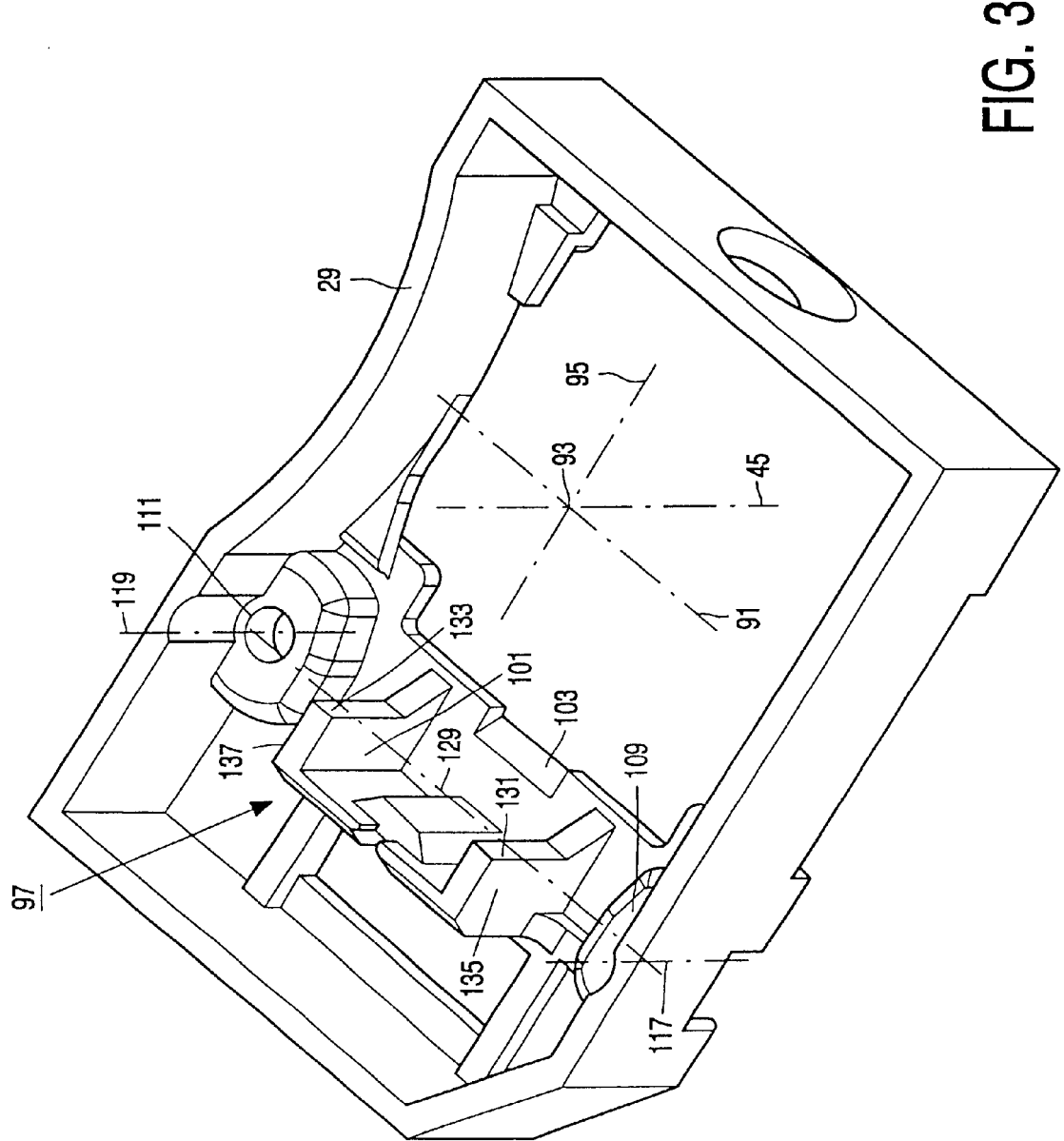
FIG. 3 shows a base part with a supporting member of the optical scanning device as shown in FIG. 2.
Figure 4:
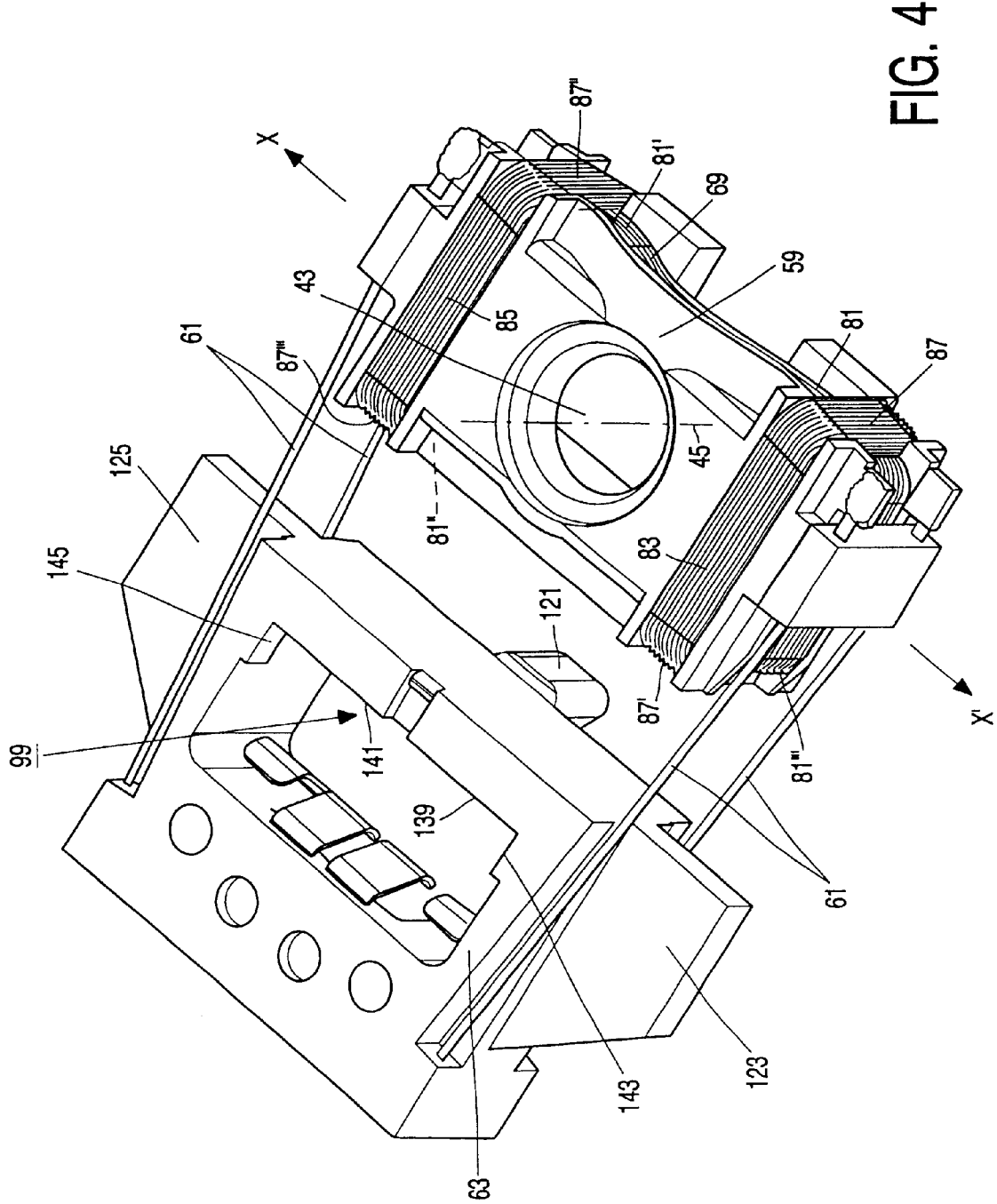
FIG. 4 shows a suspension member with a lens system of the optical scanning device as shown in FIG. 2.

The first actuator 65 is provided with a translator part, which is arranged around the lens system 43, and which comprises an electric coil 69, which is only partly visible in FIGS. 2, 4 and 5. In operation, the coil 69 cooperates with a stator part of the first actuator 65, which, as shown in FIGS. 2 and 5, comprises a magnetic circuit 71, which is secured in a fixed position with respect to the base part 29. It is noted that FIG. 3 only shows the base part 29, not the magnetic circuit 71. Said magnetic circuit 71 comprises two pairs of oppositely arranged permanent magnets 73, which are each magnetized in a direction B at right angles to the optical axis 45 of the lens system 43 and substantially at right angles to the radial directions X and X', as shown in FIGS. 2 and 5. The magnetic circuit 71 further comprises a plate-shaped closing yoke 75 and two yokes 77, which are each provided on the closing yoke 75 between, respectively, one of the pairs of magnets 73. It is noted that the closing yoke 75 and the yokes 77 are not visible in FIG. 2, while FIG. 5 shows the closing yoke 75 and one of the yokes 77. Between the magnets 73 and the yokes 77 there are four air gaps 79 in which, in FIG. 4 partly visible, wire sections 81, 81', 81" and 81''' of the coil 69 are present, which extend substantially perpendicularly to the optical axis 45 of the lens system 43 and, viewed in a direction parallel to the optical axis 45 of the lens system 43, are arranged in a side-by-side relationship. In operation, interaction between the magnetic field B of the permanent magnets 73 and an electric current in the coil 69 leads to the generation of a Lorentz force, which is directed substantially parallel to the optical axis 45 of the lens system 43, under the influence of which Lorentz force the lens system 43 is displaced in a direction parallel to the optical axis 45. The second actuator 67 is provided with two series-arranged coils 83 and 85, which, viewed in the radial directions X and X', are provided on either side of the lens system 43 and constitute a translator part of the second actuator 67. In FIGS. 2 and 4, the coils 83 and 85 are only partly visible. The coils 83 and 85 also cooperate with the magnetic circuit 71. To this end, the coils 83 and 85 each comprise wire sections, 87, 87', 87" and 87''', shown in FIG. 4, which extend substantially parallel to the optical axis 45 of the lens system 43, and which wire sections are also situated in the air gaps 79 of the magnetic circuit 71. In operation, interaction between the magnetic field B of the magnets 73 in the air gaps 79 and an electric current in the coils 83 and 85 leads to the generation of a Lorentz force, which is directed substantially parallel to the radial directions X and X', under the influence of which Lorentz force the lens system 43 is displaced in a direction parallel to the radial directions X and X'. The current in the coil 69 of the first actuator 65 is supplied via two of the four metal rods 61, while the current in the series-arranged coils 83 and 85 is supplied via the two other rods 61.

The optical scanning device 17 comprises a mechanical adjusting member 89 by means of which an inclination of the lens system 43 with respect to the information carrier 9 can be set about a first inclination axis 91, which extends through an optical center 93 of the lens system 43 and is directed parallel to the X direction, and about a second inclination axis 95, which also extends through the optical center 93 and is directed at right angles to the first inclination axis 91 and the optical axis 45. As a result of manufacturing tolerances, in particular manufacturing tolerances in the position of the lens system 43 with respect to the suspension member 63, the lens system 43 demonstrates an undesirable inclination or oblique position, after the assembly of the scanning device 17, with respect to the information carrier 9 about the first inclination axis 91 and the second inclination axis 95, which leads, particularly in the case of information carriers with a relatively high information density, such as a DVD, to improper functioning of the scanning device 17. After the assembly of the scanning device 17, said inclination is set once within predetermined relatively narrow limiting values by means of the adjusting member 89, whereafter the set inclination is locked. Said inclination is measured with respect to a reference information carrier. The adjusting member 89 comprises a first part 97, which will be described in greater detail hereinafter, and a second part 99, which will also be described in greater detail hereinafter, and which second part cooperates with the first part 97 and can be displaced with respect to said first part 97. In accordance with the invention, the second part 99 of the adjusting member 89 is provided on the suspension member 63, while the first part 97 of the adjusting member 89 is provided on a supporting member 101, which, like the suspension member 63, is arranged next to the lens system 43, viewed in a direction transverse to the optical axis 45. The supporting member 101, which is visible in FIGS. 2, 3, 5 and 6, is arranged in a fixed position with respect to the base part 29 and the stator part of the first actuator 65 and the second actuator 67, and in the embodiment of the scanning device 17 shown in FIG. 2, a large part of said supporting member is surrounded by the suspension member 63. Thus, the adjusting member 89, as well as the suspension member 63 and the supporting member 101, are situated next to the lens system 43, viewed in a direction transverse to the optical axis 45, so that a constructional height of the optical scanning device 17 in accordance with the invention is substantially not influenced by the presence of the adjusting member 89, the suspension member 63 and the supporting member 101, viewed in a direction parallel to the optical axis 45. As a result, said constructional height is substantially determined by dimensions of the lens system 43, resulting in a substantial reduction of said constructional height. As the adjusting member 89, the suspension member 63 and the supporting member 101 are arranged next to the lens system 43, viewed in a direction transverse to the optical axis 45, the adjusting member 89, the suspension member 63 and the supporting member 101 are at a distance from the radiation beam path 49, so that no further constructional measures are required to avoid that the adjusting member 89, the suspension member 63 and the supporting member 101 obstruct the radiation beam path 49. In addition, in said positions, the adjusting member 89, the suspension member 63 and the supporting member 101 do not influence the freedom of movement of the lens system 43 in directions parallel to the optical axis 45 and parallel to the X direction. As the supporting member 101 is arranged in a fixed position with respect to the stator part of the first actuator 65 and the second actuator 67, setting of the inclination of the lens system 43 with respect to said reference information carrier causes also an inclination of the translator parts of the first and the second actuator 65, 67 secured to the lens system 43 to be influenced with respect to the stator part. When the optical scanning device 17 is assembled, the stator part of the actuators 65, 67 is arranged in an accurate position on the base part 29, so that the stator part is in a desired, accurate position with respect to said reference information carrier. When the inclination of the lens system 43 with respect to the reference information carrier is subsequently set within the predetermined limiting values by means of the adjusting member 89, the inclination of the translator parts of the actuators 65, 67 with respect to the stator part is simultaneously set within predetermined limiting values.

Figure 6:
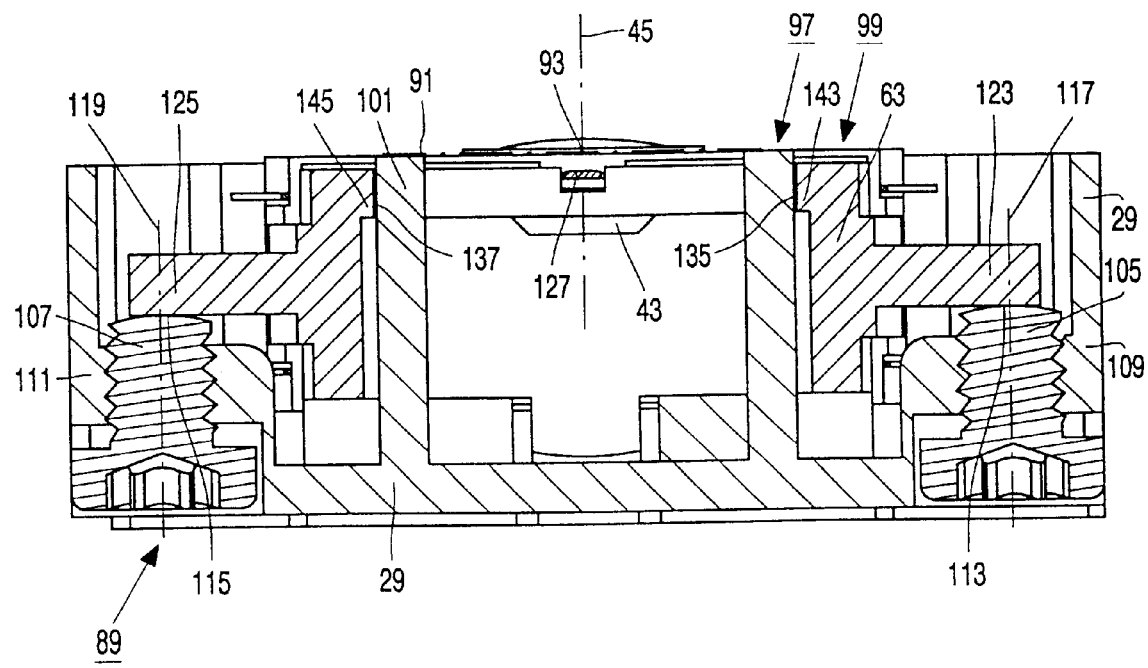
FIG. 6 is a sectional view taken on the line VI—VI in FIG. 2.

As shown in FIGS. 3 and 5, the first part 97 of the adjusting member 89 comprises a first supporting surface 103 which is provided in a fixed position on the supporting member 101. The first supporting surface 103 extends substantially parallel to the first inclination axis 91 and obliquely with respect to the optical axis 45, so that the first supporting surface 103 has a component which is directed perpendicularly to the optical axis 45. In addition, the first part 97 has two adjusting screws 105, 107, shown in section in FIG. 6, which can be turned into two threaded bushes 109, 111, shown in FIG. 3, which are integrated in the base part 29. End portions of the adjusting screws 105, 107 form, respectively, a second supporting surface 113 and a third supporting surface 115 of the first part 97 of the adjusting member 89, which extend substantially perpendicularly to the optical axis 45. The adjusting screws 105, 107 have center lines 117, 119 which extend parallel to the optical axis 45, so that the second supporting surface 113 and the third supporting surface 115 can be displaced, with respect to the base part 29 and the supporting member 101, in a direction parallel to the optical axis 45 by turning the adjusting screws 105, 107 in the threaded bushes 109, 111. The second part 99 of the adjusting member 89 comprises a first supporting element 121, shown in FIGS. 4 and 5, which cooperates with the first supporting surface 103, and a second supporting element 123 and a third supporting element 125 for cooperating with, respectively, the second supporting surface 113 and the third supporting surface 115. The first supporting element 121, the second supporting element 123 and the third supporting element 125, shown in FIGS. 4 and 6 are arranged in fixed positions on the suspension element 63 and bear against, respectively, the first supporting surface 103, the second supporting surface 113 and the third supporting surface 115 under the influence of a pretensioning force supplied by an elastically deformable pretensioning element 127 of the adjusting member 89, as shown in FIGS. 2 and 5. As is further shown in FIGS. 3 and 6, the second supporting surface 113 and the third supporting surface 115 are positioned on either side of, and substantially equidistantly from, the first supporting surface 103, viewed in a direction parallel to the first inclination axis 91, while an imaginary line 129, which extends through the second supporting surface 113 and the third supporting surface 115 is at a much larger distance from the optical axis 45 than a distance present between the optical axis 45 and the first supporting surface 103. As said three supporting elements 121, 123, 125 bear against said three supporting surfaces 103, 113 115 under the influence of a pretensioning force, a degree of freedom of the suspension element 63 in a direction parallel to the optical axis 45, and degrees of freedom of the suspension element 63 and the lens system 43 about the first inclination axis 91 and the second inclination axis 95 are fixed in a statically determined way, a position of the lens system 43 also being determined, viewed in a direction parallel to the optical axis 45, by a Lorentz force supplied by the first actuator 65. By using said three supporting surfaces 103, 113, 115, and said three supporting elements 121, 123, 125, the inclination of the lens system 43 with respect to the reference information carrier about the first inclination axis 91 and the second inclination axis 95 can be readily and accurately set. The inclination of the lens system 43 about the first inclination axis 91 can be set by displacing the second supporting surface 113 and the third supporting surface 115 over equal distances and in equal directions, by means of both adjusting screws 105, 107. The inclination of the lens system 43 about the second inclination axis 95 can be set by displacing the second supporting surface 113 and the third supporting surface 115 over equal distances, yet in opposite directions, by means of both adjusting screws 105, 107. The inclination of the lens system 43 thus set can be locked in a simple and reliable way by locking both adjusting screws 105, 107 with respect to the supporting member 101 by means of, for example, an adhesive.

The first part 97 of the adjusting member 89 is further provided with a fourth supporting surface 131 and a fifth supporting surface 133, which are visible in FIGS. 3 and 5, and which are provided in fixed positions on the supporting member 101 and substantially extend in a common imaginary plane which extends parallel to the optical axis 45 and the first inclination axis 91. The first part 97 of the adjusting member 89 is further provided with a sixth supporting surface 135 and a seventh supporting surface 137, which are visible in FIGS. 3 and 6, and which are also provided in fixed positions on the supporting member 101 and which each substantially extend in an imaginary plane which extends parallel to the optical axis 45 and the second inclination axis 95. The second part 99 of the adjusting member 89 is provided with a fourth supporting element 139 and a fifth supporting element 141 for cooperating with, respectively, the fourth supporting surface 131 and the fifth supporting surface 133. The fourth supporting element 139 and the fifth supporting element 141, which are visible in FIGS. 4 and 5, are provided in fixed positions on the suspension element 63 and bear against the fourth supporting surface 131 and the fifth supporting surface 133 under the influence of a pretensioning force exerted by the pretensioning element 127. The second part 99 of the adjusting member 89 further comprises a sixth supporting element 139, which is visible in FIGS. 4 and 6, and which is also provided in a fixed position on the suspension element 63 for cooperating with the sixth supporting surface 135. As the pretensioning force supplied by the pretensioning element 127 is substantially without a component which is directed at right angles to the sixth supporting surface 135, the second part 99 comprises a seventh supporting element 145, also visible in FIGS. 4 and 6, which serves to keep the sixth supporting element 143 and the sixth supporting surface 135 in position with respect to one another, said seventh supporting element also being provided in a fixed position on the suspension element 63 for cooperating with the seventh supporting surface 137. In this manner, the construction and the fastening of the pretensioning element 127 are simplified by using the seventh supporting surface 137 and the seventh supporting element 145. By using the fourth, the fifth and the sixth supporting surface 131, 133, 135, and the fourth, the fifth and the sixth supporting element 139, 141, 143, a degree of freedom of the suspension element 63 in a direction parallel to the X direction, a degree of freedom of the suspension element 63, and the lens system 43 suspended therefrom, in a direction perpendicular to the optical axis 45 and perpendicular to the X direction, and a degree of freedom of the suspension element 63 and the lens system 43 about the optical axis 45 are fixed in a statically determined manner, a position of the lens system 43, viewed in a direction parallel to the X direction, also being determined by a Lorentz force supplied by the second actuator 67.

The first supporting surface 103, preferably, is not flat, but instead it, preferably, is a segment of a sphere the center of which substantially coincides with the optical center 93 of the lens system 43. Preferably, the fourth supporting surface 131 and the fifth supporting surface 133 are not flat either, but instead they, preferably, also are segments of a sphere of a common imaginary sphere the center of which substantially coincides with the optical center 93 of the lens system 43, whereby a radius of curvature of the fourth supporting surface 131 and the fifth supporting surface 133 does not have to be equal to a radius of curvature of the first supporting surface 103. In this manner it is achieved that a position of the optical center 93 of the lens system 43 does not change with respect to said reference information carrier upon setting the inclination of the lens system 43 by means of the adjusting member 89.

By means of the above-described optical player in accordance with the invention and the optical scanning device 17 in accordance with the invention, information present on the information track can be read or information can be written on the information track during scanning the information track of the information carrier 9. It is to be noted that the invention also relates to optical players and optical scanning devices which can only be used to read information present on an information track of an information carrier or write information on an information track of an information carrier.

In the above-described embodiment of the optical scanning device 17 in accordance with the invention, the supporting member 101 is arranged in a fixed position with respect to the base part 29 and the stator part of the actuators 65, 67. It is to be noted that the invention also includes embodiments of an optical scanning device wherein the suspension member is arranged in a fixed position with respect to the base part and the stator part provided on said base part, and wherein the supporting member is arranged in a fixed position with respect to, for example, a main frame of the optical scanning device. In such an embodiment, use is made of the adjusting member, as in the case of the optical scanning device described in U.S. Pat. No. 5,703,864, to set the inclination of a unit, which, apart from the lens system and the translator part of the actuator, also comprises the base part and the stator part of the actuator. Thus, in said embodiment, a position of the lens system with respect to the base part remains substantially the same, so that an inclination of the translator part of the actuator with respect to the rotor part, which inclination is caused by manufacturing tolerances, cannot be adjusted.

It is further to be noted that, in accordance with the invention, instead of the above-described first part 97 and the second part 99, the adjusting member may alternatively be provided with a first part and a second part, which can be displaced with respect to said first part, of a different type. Thus, the first part and the second part may also be embodied so as to be, for example, two bearing parts of a spherical bearing which cooperate with one another.

In the above-described embodiment of the optical scanning device 17 in accordance with the invention, the suspension member 63 and the supporting member 101 are both arranged next to the lens system 43, viewed transversely to the optical axis 45, with the suspension member 63 surrounding a substantial part of the supporting member 101. It is to be noted that the suspension member and the supporting member may also be differently arranged with respect to one another, for example, the suspension member may be substantially completely arranged between the lens system and the supporting member, viewed transversely to the optical axis, or the suspension member, the supporting member and the lens system are triangularly arranged with respect to one another, viewed in an imaginary plane transverse to the optical axis.

What is claimed is:

1. An optical scanning device for scanning an optically scannable information carrier, which scanning device is provided with:
   a radiation source,
   an optical lens system having an optical axis for focussing a radiation beam supplied, in operation, by the radiation source into a scanning spot on the information carrier, an actuator for displacing the lens system with respect to a base part of the scanning device in a direction parallel to the optical axis, and an adjusting member for setting an inclination of the lens system with respect to the information carrier, the lens system being elastically suspended from a suspension member which, viewed in a direction transverse to the optical axis, is arranged next to the lens system, while the adjusting member is provided with a first part and a second part, which can be displaced with respect to the first part, wherein the second part of the adjusting member is provided on the suspension member, while the first part of the adjusting member is provided on a supporting member which is arranged next to the lens system, viewed in a direction transverse to the optical axis.

2. An optical scanning device as claimed in claim 1, wherein the supporting member is arranged in a fixed position with respect to the base part and a stator part of the actuator.

3. An optical scanning device as claimed in claim 1, wherein:

the first part of the adjusting member is provided with a first supporting surface having a component which extends at right angles to the optical axis, which first supporting surface is provided in a fixed position on the supporting member, and with a second and a third supporting surface which each have a component which extends at right angles to the optical axis, and which are in positions, with respect to the supporting member, which can be adjusted, viewed in a direction parallel to the optical axis, while the second part of the adjusting member is provided with a first, a second and a third supporting element, which bear against, respectively, the first, the second and the third supporting surface under the influence of a pretensioning force originating from an elastic pretensioning element, the second and the third supporting surface being arranged on either side of the first supporting surface, and a distance between the optical axis and an imaginary line through the second and the third supporting surface differing substantially from a distance between the optical axis and the first supporting surface.

4. An optical scanning device as claimed in claim 3, wherein the second and the third supporting surface are each provided on an adjusting screw which can be turned with respect to the supporting member.

5. An optical scanning device as claimed in claim 3, wherein:

the first part of the adjusting member is provided with a fourth and a fifth supporting surface, which are substantially situated in an imaginary plane which extends parallel to the optical axis, and are provided in fixed positions on the supporting member, and with a sixth supporting surface, which extends perpendicularly to the fourth and the fifth supporting surface and parallel to the optical axis, and which is provided in a fixed position on the supporting member, while the second part of the adjusting member is provided with a fourth and a fifth supporting element, which bear against, respectively, the fourth and the fifth supporting surface under the influence of a pretensioning force originating from the pretensioning element, and with a sixth supporting element for cooperation with the sixth supporting surface.

6. An optical scanning device as claimed in claim 5, wherein the first part and the second part of the adjusting member are provided with, respectively, a seventh supporting surface and, cooperating therewith, a seventh supporting element by means of which the sixth supporting surface and the sixth supporting element can be held in position with respect to one another.

7. An optical player comprising:

a table which is rotatable about an axis of rotation, an optical scanning device comprising:

a radiation source, an optical lens system having an optical axis for scanning an optically scannable information carrier which can be placed on the table, and an actuator for displacing the lens system with respect to a base part of the scanning device in a direction parallel to the optical axis, and an adjusting member for setting an inclination of the lens system with respect to the information carrier, the lens system being elastically suspended from a suspension member which, viewed in a direction transverse to the optical axis, is arranged next to the lens system, while the adjusting member is provided with a first part and a second part, which can be displaced with respect to the first part, wherein the second part of the adjusting member is provided on the suspension member, while the first part of the adjusting member is provided on a supporting member which is arranged next to the lens system, viewed in a direction transverse to the optical axis, the optical player further comprising a displacement device by means of which, during operation, at least the lens system of the scanning device can be displaced, substantially in a radial direction, with respect to the axis of rotation.

8. The optical player as claimed in claim 7, wherein the supporting member is arranged in a fixed position with respect to the base part and a stator part of the actuator.

9. The optical player as claimed in claim 7, wherein:

the first part of the adjusting member is provided with a first supporting surface having a component which extends at right angles to the optical axis, which first supporting surface is provided in a fixed position on the supporting member, and with a second and a third supporting surface which each have a component which extends at right angles to the optical axis, and which are in positions, with respect to the supporting member, which can be adjusted, viewed in a direction parallel to the optical axis, while the second part of the adjusting member is provided with a first, a second and a third supporting element, which bear against, respectively, the first, the second and the third supporting surface under the influence of a pretensioning force originating from an elastic pretensioning element, the second and the third supporting surface being arranged on either side of the first supporting surface, and a distance between the optical axis and an imaginary line through the second and the third supporting surface differing substantially from a distance between the optical axis and the first supporting surface.

10. The optical player as claimed in claim 9, wherein the second and the third supporting surface are each provided on an adjusting screw which can be turned with respect to the supporting member.

11. The optical player as claimed in claim 9, wherein:

the first part of the adjusting member is provided with a fourth and a fifth supporting surface, which are substantially situated in an imaginary plane which extends parallel to the optical axis, and are provided in fixed positions on the supporting member, and with a sixth supporting surface, which extends perpendicularly to the fourth and the fifth supporting surface and parallel to the optical axis, and which is provided in a fixed position on the supporting member, while the second part of the adjusting member is provided with a fourth and a fifth supporting element, which bear against, respectively, the fourth and the fifth supporting surface under the influence of a pretensioning force originating from the pretensioning element, and with a sixth supporting element for cooperation with the sixth supporting surface.

12. The optical player as claimed in claim 11, wherein the first part and the second part of the adjusting member are provided with, respectively, a seventh supporting surface and, cooperating therewith, a seventh supporting element by means of which the sixth supporting surface and the sixth supporting element can be held in position with respect to one another.

13. The optical scanning device of claim 1, further comprising a displacement device capable of displacing at least the lens system substantially in a radial direction with respect to an axis of rotation associated with the information carrier.

14. A method, comprising:

receiving a radiation beam from a radiation source, focussing the radiation beam into a scanning spot on an information carrier using an optical lens system having an optical axis, displacing the lens system in a direction parallel to the optical axis, and setting an inclination of the lens system with respect to the information carrier using an adjusting member, wherein the lens system is elastically suspended from a suspension member that, viewed in a direction transverse to the optical axis, is arranged next to the lens system;

wherein the adjusting member is provided with a first part and a second part that can be displaced with respect to the first part, the second part of the adjusting member provided on the suspension member, the first part of the adjusting member provided on a supporting member that is arranged next to the lens system when viewed in a direction transverse to the optical axis.

15. The method of claim 14, wherein the supporting member is arranged in a fixed position with respect to a stator part of an actuator capable of displacing the lens system.

16. The method of claim 14, wherein:

the first part of the adjusting member is provided with:

a first supporting surface having a component which extends at a right angle to the optical axis, the first supporting surface provided in a fixed position on the supporting member, and a second and third supporting surfaces each having a component that extends at a right angle to the optical axis and being in positions, with respect to the supporting member, that can be adjusted, and the second part of the adjusting member is provided with a first, second and third supporting elements that bear against, respectively, the first, second and third supporting surfaces under the influence of a pretensioning force originating from an elastic pretensioning element, the second and third supporting surfaces being arranged on either side of the first supporting surface, a distance between the optical axis and an imaginary line through the second and third supporting surfaces differing substantially from a distance between the optical axis and the first supporting surface.

17. The method of claim 16, wherein the second and third supporting surfaces are each provided on an adjusting screw that can be turned with respect to the supporting member.

18. The method of claim 16, wherein:

the first part of the adjusting member is further provided with:

a fourth and fifth supporting surfaces that are substantially situated in an imaginary plane extending parallel to the optical axis, the fourth and fifth supporting surfaces provided in fixed positions on the supporting member, and a sixth supporting surface extending perpendicularly to the fourth and fifth supporting surfaces and parallel to the optical axis, the sixth supporting surface provided in a fixed position on the supporting member, and the second part of the adjusting member is further provided with:

a fourth and fifth supporting elements that bear against, respectively, the fourth and fifth supporting surfaces under the influence of a pretensioning force originating from the pretensioning element, and a sixth supporting element for cooperation with the sixth supporting surface.

19. The method of claim 18, wherein the first part and the second part of the adjusting member are provided with, respectively, a seventh supporting surface and, cooperating therewith, a seventh supporting element by means of which the sixth supporting surface and the sixth supporting element can be held in position with respect to one another.

20. The method of claim 14, further comprising displacing the lens system substantially in a radial direction with respect to an axis of rotation associated with the information carrier.

* * * * *